United States Patent
Schaffrath et al.

(10) Patent No.: US 9,890,702 B2
(45) Date of Patent: Feb. 13, 2018

(54) SWITCHING VALVE AND INTERNAL COMBUSTION ENGINE HAVING SUCH A SWITCHING VALVE AND A METHOD FOR A SWITCHING VALVE

(71) Applicant: FEV GMBH, Aachen (DE)

(72) Inventors: Uwe Schaffrath, Herzogenrath (DE); Karsten Wittek, Flein (DE); Michael Paul, Weissach (DE); Paul Grzeschik, Aachen (DE)

(73) Assignee: FEV GmbH, Aachen (DE)

( * ) Notice: Subject to any disclaimer, the term of this patent is extended or adjusted under 35 U.S.C. 154(b) by 113 days.

(21) Appl. No.: 14/783,947

(22) PCT Filed: Apr. 11, 2014

(86) PCT No.: PCT/EP2014/000973
§ 371 (c)(1),
(2) Date: Jan. 22, 2016

(87) PCT Pub. No.: WO2014/166636
PCT Pub. Date: Oct. 16, 2014

(65) Prior Publication Data
US 2016/0169099 A1    Jun. 16, 2016

(30) Foreign Application Priority Data
Apr. 12, 2013   (DE) .................. 10 2013 206 513

(51) Int. Cl.
*F02B 75/04*   (2006.01)
*F02B 75/26*   (2006.01)
(Continued)

(52) U.S. Cl.
CPC ............ *F02B 75/045* (2013.01); *F16K 11/07* (2013.01); *F16K 11/0704* (2013.01);
(Continued)

(58) Field of Classification Search
CPC .......... F02B 75/045; F02B 75/32; F16C 7/06; F16C 23/10; F02F 7/0053; F02F 3/00;
(Continued)

(56) References Cited

U.S. PATENT DOCUMENTS 2,989,954 A * 6/1961 Hulbert .................. F02B 75/04
                                                 123/48 B
3,678,954 A   7/1972 Ostwald et al.
(Continued)

FOREIGN PATENT DOCUMENTS

CA        2089815 A1    8/1994
DE   102010016037   *   9/2011  ............ F02B 75/045
(Continued)

OTHER PUBLICATIONS

International Search Report dated Jul. 3, 2014, International Application No. PCT/EP2014/000973, filed Apr. 11, 2014.

*Primary Examiner* — Lindsay Low
*Assistant Examiner* — Syed O Hasan
(74) *Attorney, Agent, or Firm* — Dinsmore & Shohl LLP (57) ABSTRACT

A switching valve for an internal combustion engine, which has an adjustable compression ratio, namely to control a hydraulic oil flow particularly for an eccentric adjustment mechanism, having a control piston, which can be shifted by a switching mechanism similar to a ballpoint pen mechanism, wherein the control piston controls the hydraulic oil flow dependent on the switch position thereof, wherein the switching mechanism comprises at least one actuation element and a detent element, and wherein at least the control piston, the actuation element and the detent element are nested in each other so that they are implemented in a concentrically overlapping manner, at least in sections, when viewed in the shifting direction of the control piston.

18 Claims, 4 Drawing Sheets

(51) Int. Cl.
    *F16K 31/122*     (2006.01)
    *F16K 11/07*     (2006.01)
    *F16K 31/524*     (2006.01)
    *F16K 31/56*     (2006.01)

(52) U.S. Cl.
    CPC ...... *F16K 31/122* (2013.01); *F16K 31/52483* (2013.01); *F16K 31/56* (2013.01)

(58) Field of Classification Search
    CPC ...... F16H 19/04; F16B 15/14; F16B 15/1457; F16K 31/122; F16K 11/07; F16K 11/0704
    USPC ............ 123/48 B, 78 BA, 48 R, 78 E, 197.3
    See application file for complete search history.

(56) References Cited

U.S. PATENT DOCUMENTS

| | | |
|---|---|---|
| 5,609,178 A | 3/1997 | Hennig et al. |
| 7,685,974 B2 * | 3/2010 | Berger .................. F02B 75/045 |
| | | 123/48 B |

FOREIGN PATENT DOCUMENTS

| | | |
|---|---|---|
| DE | 102010016037 A1 | 9/2011 |
| EP | 0438121 A1 | 7/1991 |

* cited by examiner

SWITCHING VALVE AND INTERNAL COMBUSTION ENGINE HAVING SUCH A SWITCHING VALVE AND A METHOD FOR A SWITCHING VALVE

CROSS-REFERENCE TO RELATED APPLICATIONS

This application is the U.S. national stage of PCT/EP2014/000973 filed Apr. 11, 2014, which claims priority of German Patent Application 10 2013 206 513.2 filed Apr. 12, 2013.

TECHNICAL FIELD

The present specification relates to a switching valve for an internal combustion engine having an adjustable compression ratio, as well as to a method and to an internal combustion engine.

BACKGROUND

Figure 1:
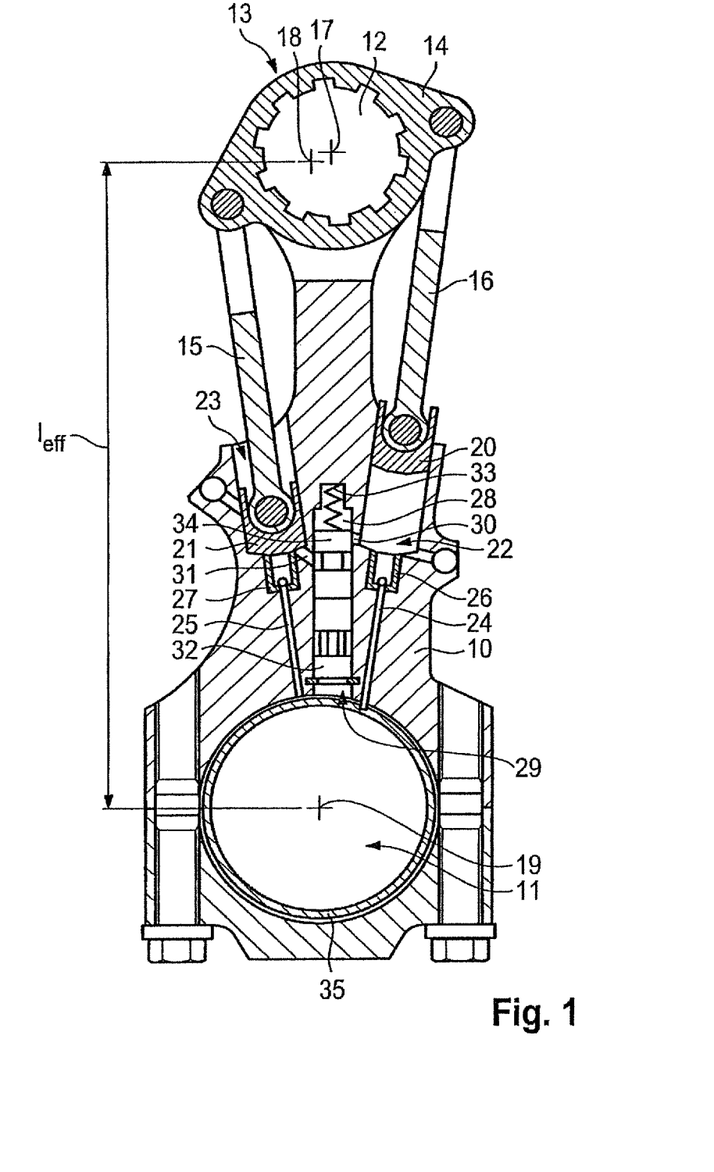
FIG. 1 is a detail of an internal combustion engine having an adjustable compression ratio, known from prior art.

FIG. 1 shows a detail of a connecting rod of an internal combustion engine with an adjustable compression ratio, as known from DE 10 2010 016 037 A1. FIG. 1 illustrates a connecting rod 10 having a crank pin bearing eye 11 and a piston pin bearing eye 12, wherein the crank pin bearing eye 11 serves to connect the connecting rod 10 with a crankshaft not illustrated in FIG. 1, and the piston pin bearing eye 12 serves to connect the connecting rod 10 with a cylinder piston of the internal combustion engine, which piston is not illustrated in FIG. 1. The connecting rod 10 has an eccentric adjustment mechanism assigned thereto, which comprises an eccentric body 14 and eccentric rods 15, 16. The eccentric body 14 has a piston pin bore arranged eccentrically with respect to a centre 17 of the piston pin bearing eye 12 and having a centre 18, the piston pin bore receiving a piston pin. The eccentric adjustment mechanism 13 serves to adjust the effective connecting rod length leff, wherein the connecting rod length is defined as the distance of the centre 18 of the piston pin bore to a centre 19 of the crank pin bearing eye 11. For turning the eccentric body 14 and thus for changing the effective connecting rod length leff, the eccentric rods 15, 16 of the eccentric adjustment mechanism 13 are adapted to be displaced. Each eccentric rod 15 has a piston 20 and 21, respectively, assigned thereto which is slidably supported or guided in a hydraulic chamber 22 and 23, respectively.

A hydraulic pressure prevails in the hydraulic chambers 22, 23 that acts on the pistons 20 and 21 respectively assigned to the eccentric rods 15, 16, wherein a shifting of the eccentric rods is possible or not possible in dependence on the quantity of oil in the hydraulic chambers 22, 23.

The adjustment of the eccentric adjustment mechanism 13 is initiated by the action of mass and load forces of the internal combustion engine, which act on the eccentric adjustment mechanism 13 during a duty cycle of the internal combustion engine. During one duty cycle, the directions of action of the forces acting on the eccentric adjustment mechanism 13 are constantly changing. The adjustment movement is supported by the hydraulic oil-pressurized pistons 20, 21 which act upon the eccentric rods 15, 16, wherein the pistons 20, 21 prevent a return of the eccentric adjustment mechanism 13 due to varying directions of action of the forces acting on the eccentric adjustment mechanism 13. The eccentric rods 15, 16 that cooperate with the pistons 20, 21 are connected with the eccentric body 14 on either side thereof. The hydraulic chambers 23 and 24, in which the pistons 20, 21 are guided, can be supplied with hydraulic oil via hydraulic oil lines 24 and 25 and from the crank pin bearing eye 11. Check valves 26 and 27 prevent a return flow off hydraulic oil from the hydraulic chambers 22 and 23 into the hydraulic lines 24 and 25. A bore 28 in the connecting rod 10 receives a switching valve 29 whose function is also already known from DE 10 2010 016 037 A1, with the switch position of the switching valve 29 determining which of the hydraulic chambers 22 and 23 will be filled with hydraulic oil and which of the hydraulic chambers 22 and 23 will be emptied, wherein the adjustment direction or the turning direction of the eccentric adjustment mechanism 13 depends thereon.

Fluid lines 30 and 31 respectively connect the hydraulic chambers 22 and 23 with the bore 28 that receives the switching valve 29. Of the switching valve 29, FIG. 1 schematically shows an actuation element 32, a spring element 33 and a control piston 34, the function of these components of the switching valve 29 being already known from DE 10 2010 016 037 A1.

As explained above, the hydraulic oil, which acts on the pistons 20, 21 guided in the hydraulic chambers 22, 23, is supplied to the hydraulic chambers 22, 23 from the crank pin bearing eye 11 via hydraulic lines 24 and 25, wherein the connecting rod 10 engages the crankshaft, not illustrated in FIG. 1, by the crank pin bearing eye 11 such that a connecting rod bearing shell 35 is arranged between the crankshaft, i.e. a crankshaft journal thereof, and the crank pin bearing eye 11.

According to DE 10 2010 016 037 A1, the control piston of the switching valve is adapted to be displaced or switched by a switching mechanism resembling a ball pen mechanism, wherein, besides the actuation element and the spring element, the switching mechanism preferably has a stationary detent element in the form of a control sleeve, and a turning element in the form of a turning sleeve. The spring element, the control piston, the turning element and the actuation element are all positioned one behind the other in the shifting direction of the control piston. The detent element surrounds the turning element and the actuation element at least in sections on the radial outer side. The switching valve therefore has a relatively long structure.

SUMMARY

It is an object of the present specification to provide a switching valve for an internal combustion engine with an adjustable compression ratio, which has a compact structure, a method for the switching valve and an internal combustion engine having such a switching valve.

The present specification proposes a switching valve for an internal combustion engine, as well as a method for a switching valve and an internal combustion engine. Advantageous features, embodiments and developments are mentioned in the following description, the Figures and the claims, with individual features of an embodiment not being restricted to the same. Rather, one or a plurality of features of an embodiment can be combined with one or a plurality of features of another embodiment into further embodiments. Likewise, the features mentioned in the context of a specific embodiment may also be generalized or also be used in other embodiments, particularly in other applications.

The present specification relates to a switching valve for an internal combustion engine having an adjustable compression ratio, namely for controlling a hydraulic oil flow in particular for an eccentric adjustment mechanism, having a control piston displaceable by a switching mechanism similar to a ball pen mechanism. The control piston controls the hydraulic oil flow in dependence on its switch position. The switching mechanism further comprises at least an actuation element and a detent element. The control piston and the actuation element, as well as the detent element of the switching mechanism are nested at least such that they are implemented in a concentrically overlapping manner, at least in sections, when viewed in the shifting direction of the control piston. Thereby, the structure of the switching valve can be shortened and a more compact structure of the switching valve can accordingly be realized.

Preferably, the control piston concentrically surrounds the actuation element and the detent element, at least in sections, on the radial outer side. In a preferred embodiment the actuation element concentrically surrounds the detent element, at least in sections, on the radial outer side. This is advantageous for providing a compact structure of the switching valve.

Preferably, the spring element extends into a circumferential groove of the control piston and is supported on the control piston.

It is preferred that the spring element concentrically surrounds a radially inner delimiting wall of the groove, at least in sections, on the radially outer side and that a radially outer delimiting wall of the groove concentrically surrounds the spring element, at least in sections, on the radially outer side.

In a preferred development a turning element of the switching mechanism is positioned ahead of or behind the actuation element when seen in the shifting direction of the control piston. Advantageously, the control piston concentrically surrounds the turning element, at least in sections, on the radially outer side. In a preferred embodiment the turning element concentrically surrounds the detent element, at least in sections, on the radially outer side. Again, this is advantageous for providing a more compact structure of the switching valve.

It is preferred that the actuation element presses against the turning element or that the turning element presses against the actuation element.

Preferably, the turning element is adapted to be shifted translationally by the actuation element, wherein, if at least one protrusion of the turning element has been moved out of a groove of the detent element, the turning element can be turned with respect to the detent element.

In a preferred embodiment the control piston connects first ports and separates second ports, when in a first switch position, and the control piston separates the first ports and connects the second ports, when in a second switch position, such that, in the first switch position, a fluid line coupled with one of the first ports and leading to a first hydraulic chamber of the eccentric adjustment mechanism is coupled with a fluid line for emptying the first hydraulic chamber, which fluid line is coupled with the other of the first ports, and that, in the second switch position, a fluid line coupled with one of the second ports and leading to a second hydraulic chamber of the eccentric adjustment mechanism is coupled with a fluid line for emptying the second hydraulic chamber, which fluid line is coupled with the other of the second ports. In this regard, one of the ports via which the respective hydraulic chamber can be emptied is provided by a pressure chamber. For the actuation of the actuation element, a pressure pulse can be built in the pressure chamber so that the respective hydraulic chamber is emptied into the pressure chamber that serves to actuate the actuation element.

It is preferred that both ports via which the hydraulic chambers can be emptied, are connected with the pressure chamber that serves to actuate the actuation element, so that each of the two hydraulic chambers is respectively emptied against the oil pressure prevailing in the pressure chamber.

According to a further idea of the present specification which may be independent or be combined with the embodiments described above or below, a switching valve for an internal combustion engine which has an adjustable compression namely for controlling a hydraulic oil flow in particular for an eccentric adjustment mechanism, having a control piston (37) adapted to be shifted by a switching mechanism similar to a ball pen mechanism, the control piston (37) controlling the hydraulic oil flow independent of its switch position, and wherein the switching mechanism at least comprises an actuation element (38) and a detent element (39), characterized in that the control piston (37) connects first ports (A, A*) and separates second ports (B, B*), when in a first switch position, and that the control piston (37) separates the first ports (A, A*) and connects the second ports (B, B*), when in a second switch position, such that, in the first switch position, a fluid line (31) coupled with one of the first ports (A) and leading to a first hydraulic chamber (23) of the eccentric adjustment mechanism is coupled with a fluid line (51) for emptying the first hydraulic chamber (23), which fluid line is coupled with the other of the first ports (A*), and that, in the second switch position, a fluid line (30) coupled with one of the second ports (B) and leading to a second hydraulic chamber (22) of the eccentric adjustment mechanism is coupled with a fluid line (52) for emptying the second hydraulic chamber (22), which fluid line is coupled with the other of the second ports (B*), wherein one of the ports (A*, B*) via which the respective hydraulic chamber (22, 23) can be emptied is provided by a pressure chamber (50) in which, for the actuation of the actuation element (38), a pressure pulse can be built so that the respective hydraulic chamber (22, 23) is emptied into the pressure chamber (50) that serves to actuate the actuation element (38).

In a development, it is provided for example that both ports (A*, B*) via which the hydraulic chambers (22, 23) can be emptied, are connected with the pressure chamber (50) that serves to actuate the actuation element (38), so that each of the two hydraulic chambers (22, 23) is respectively emptied against the oil pressure prevailing in the pressure chamber.

The features of the ports, hydraulic chambers, pressure chamber, actuation element may be used in combination with each other in order to keep the structure of the switching valve as short and compact as possible.

The present specification further relates to a method for a switching valve of an internal combustion engine, preferably a switching valve as described above. The internal combustion engine has an adjustable compression ratio, namely for controlling a hydraulic oil flow especially for an eccentric adjustment mechanism. The switching valve comprises a control piston adapted to be shifted by a switching mechanism similar to a ball pen mechanism. The hydraulic oil flow is controlled in dependence on a switch position of the control piston, and the switching mechanism at least comprises an actuation element and a detent element. The method comprises at least the following steps:

determining the switch position of the switching valve via the control piston, wherein the control piston connects first ports and separates second ports, when in a first switch position, and the control piston separates the first ports and connects the second ports, when in a second switch position, such that, in the first switch position, a fluid line coupled with one of the first ports and leading to a first hydraulic chamber of the eccentric adjustment mechanism is coupled with a fluid line for emptying the first hydraulic chamber, which fluid line is coupled with the other of the first ports, and that, in the second switch position, a fluid line coupled with one of the second ports and leading to a second hydraulic chamber of the eccentric adjustment mechanism is coupled with a fluid line for emptying the second hydraulic chamber, which fluid line is coupled with the other of the second ports, wherein one of the ports via which the respective hydraulic chamber can be emptied is provided by a pressure chamber, switching the switching valve between the first switch position and the second switch position by actuating the actuation element by building up an actuation pulse in the pressure chamber, emptying the respective hydraulic chamber into the pressure chamber that serves to actuate the actuation element.

In a preferred embodiment both ports, via which the hydraulic chambers are emptied, are connected with the pressure chamber that serves to actuate the actuation element, so that each of the two hydraulic chambers is respectively emptied against the oil pressure prevailing in the pressure chamber.

It is preferred that, as the switching valve is transitioned from the first switch position into the second switch position by actuation of the actuation element, the actuation element is pressed against a turning element or the turning element is pressed against the actuation element, wherein a switching mechanism similar to a ball pen mechanism comprises the turning element. Seen in the shifting direction of the control piston, the turning element is positioned ahead of or behind the actuation element, so that the turning element is shifted translationally via the actuation element, wherein the turning element is turned relative to the detent element when at least one projection of the turning element is moved out of a groove of the detent element.

Advantageously, the actuation element is shifted by the control piston upon a movement of the control piston in dependence on the oil pressure.

The internal combustion engine which has an adjustable compression ratio, engages the at least one connecting rod by at least one cylinder and by a crankshaft. This or each connecting rod has a crank pin bearing eye for connecting the rod with the crankshaft, a piston pin bearing eye for connecting the rod with a piston of a cylinder and an eccentric adjustment mechanism for adjusting an effective connecting rod length of the respective connecting rod. The eccentric adjustment mechanism of the respective connecting rod comprises eccentric rods which are subjected to the hydraulic pressure prevailing in hydraulic chambers cooperating with the eccentric rods, and the hydraulic pressure prevailing in the hydraulic chambers of the respective connecting rod is adapted to be adjusted via a switching valve of the respective connecting rod. The switching valve of the respective connecting rod is designed corresponding to the switching valve described above.

BRIEF DESCRIPTION OF THE DRAWINGS

Further advantageous embodiments and features will become evident from the following Figures and the associated description. The individual features evident from the Figures and the description are only of exemplary nature and are not restricted to the respective embodiment. Rather, one or a plurality of features from one or a plurality of the Figures can be combined with other features from the above description to form further embodiments. Therefore, the features are not indicated as being restrictive, but as being exemplary. In the Figures.

DETAILED DESCRIPTION

The present specification relates to an internal combustion engine having an adjustable compression ratio and to a switching valve for such an internal combustion engine having an adjustable compression ratio.

The basic structure of an internal combustion engine with adjustable compression ratio is known to a person skilled in the art and has been described with reference to FIG. 1.

For the sake of completeness it will be stated once more at this point that an internal combustion engine with an adjustable compression ratio comprises at least one, preferably a plurality of cylinders. Each cylinder has a piston that is coupled with a crankshaft of the internal combustion engine via a connecting rod 10. Each connecting rod has a piston pin bearing eye at one end and a crank pin bearing eye 11 at the opposite end. By its crank pin bearing eye 11, the respective connecting rod 10 engages a crankshaft journal of the crankshaft such that a connecting rod bearing shell 35 is positioned between the crankshaft journal and the crank pin bearing eye, wherein a lubricating oil film can build between the connecting rod bearing shell and the crankshaft journal. An internal combustion engine with an adjustable combustion ratio has an eccentric adjustment mechanism 13 in the area of each connecting rod 10, which serves to adjust the effective connecting rod length of the respective connecting rod. The eccentric adjustment mechanism 13 has eccentric rods 15, 16 adapted to be shifted for adjustment of the compression ratio, the shifting being dependent on the hydraulic pressure prevailing in hydraulic chambers 22, 23 cooperating with the eccentric rods 15, 16. These hydraulic chambers 22, 23 cooperating with the eccentric rods 15, 16 are adapted to be supplied with hydraulic oil from the crank pin bearing eye 11 via 35 hydraulic oil lines 24, 25 of the respective connecting rods 10.

The adjustment of the eccentric adjustment mechanism 13 is initiated by the action of mass and load forces of the internal combustion engine. A switching valve is received in a bore 28 of the connecting rod 10, with the switch position of the switching valve determining which hydraulic chamber 22, 23 will be filled with hydraulic oil and which hydraulic chamber 22, 23 will be emptied, the adjustment direction or the turning direction of the eccentric adjustment mechanism 13 depending thereon. Fluid lines 30, 31 connect the hydraulic chambers 22, 23 with the bore 28 that receives the switching valve.

The present specification relates to details of the switching valve that allow for a compact structure of the same.

FIGS. 2 to 5 show sectional views of a switching valve 36 for an internal combustion engine with an adjustable compression ratio, wherein such a switching valve 36 is installed in the area of each connecting rod 10 in order to adjust the hydraulic oil pressure in the hydraulic chambers 22, 23 that cooperate with the eccentric rods 15, 16 of the eccentric adjustment mechanism 13.

Figure 6:
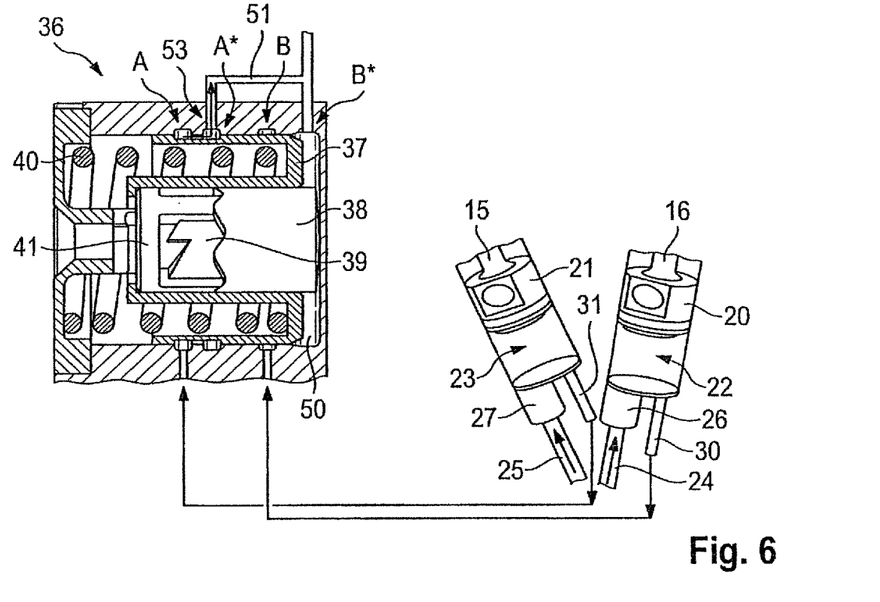
FIG. 6 shows the switching valve together with hydraulic chambers that cooperate with eccentric rods, in the first switch position of the switching valve.
Figure 7:
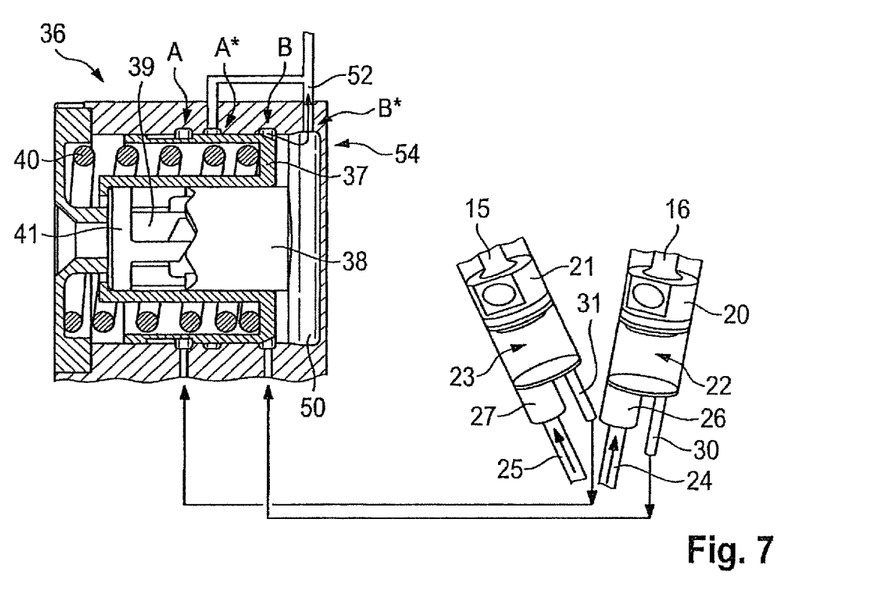
FIG. 7 shows the switching valve together with hydraulic chambers that cooperate with eccentric rods, in the second switch position of the switching valve.

FIGS. 6 and 7 are very schematical illustrations of a hydraulic diagram for the switching valve 36 in combination with the hydraulic chambers 22 and 23, with the purpose of clarifying that, depending on the switch position of the switching valve 36, one of the hydraulic chambers 22, 23 is filled with hydraulic oil and the other of the hydraulic chambers 23, 22 is emptied.

Figure 2:
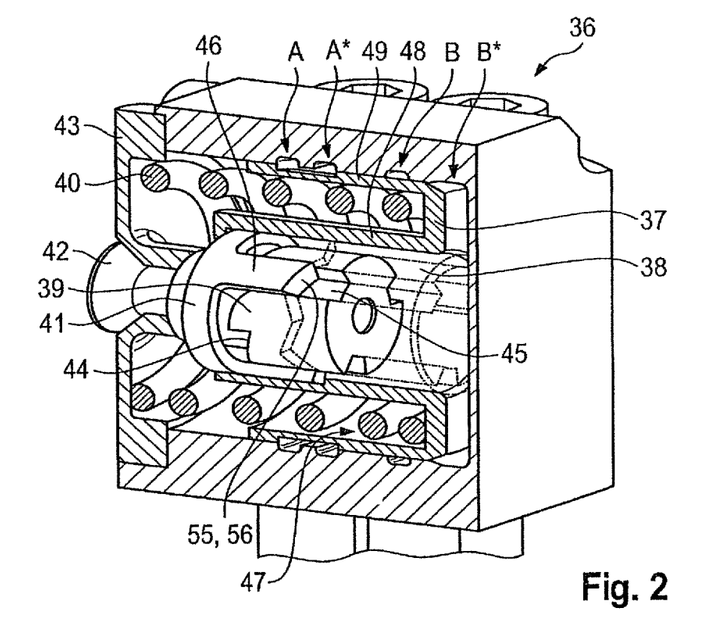
FIG. 2 shows a first cross section of a switching valve in a first switch position thereof.
Figure 3:
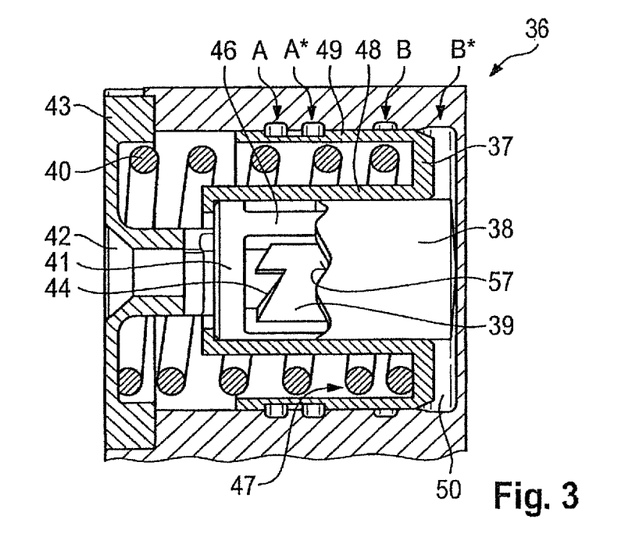
FIG. 3 shows a second cross section of a switching valve in the first switch position thereof.

In the first switch position of the switching valve 36, illustrated in FIGS. 2, 3 and 6, the ports A and A* of the switching valve 36 are short-circuited and coupled, respectively.

Accordingly, in the first switch position illustrated in FIGS. 2, 3 and 6, the fluid line 31, which cooperates with the hydraulic chamber 23 and is connected with port A, is coupled with a fluid line 51 by the short-circuited ports A and A* so as to empty the hydraulic chamber 23 in the direction of the arrow 53.

In the embodiment illustrated, engine oil pressure prevails in the fluid line 51. It should be noted at this point that the port A* may also be vented to the environment or towards the engine block or the inner space of the engine, while, in this case, no engine oil pressure would prevail in the fluid line 51.

In the first switch position of the switching valve 36 illustrated in FIGS. 2, 3 and 6, the ports B and B*, on the other hand, are separated so that no hydraulic oil can flow out from the hydraulic chamber 22 through the fluid line 30 of the hydraulic chamber 22. In the first switch position of the switching valve 36 illustrated in FIGS. 2, 3 and 6, an emptying of the hydraulic chamber 22 is thereby prevented.

Figure 4:
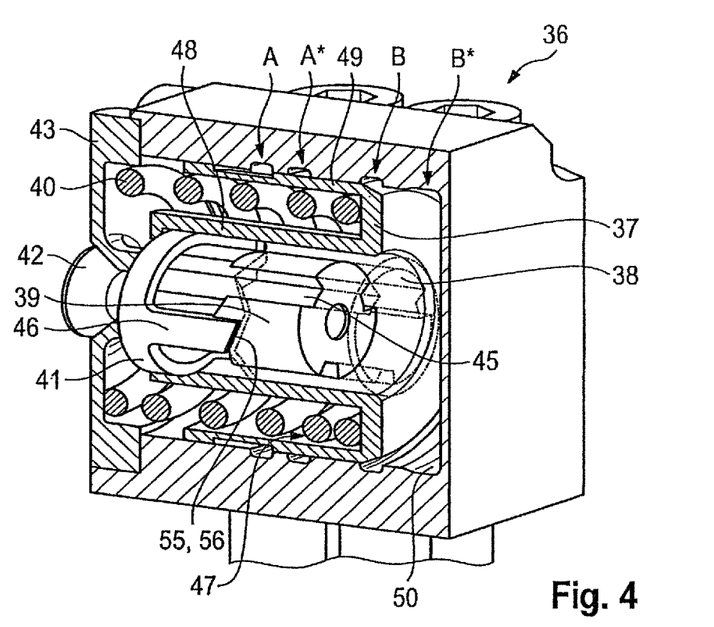
FIG. 4 shows a first cross section of a switching valve in a second switch position thereof.
Figure 5:
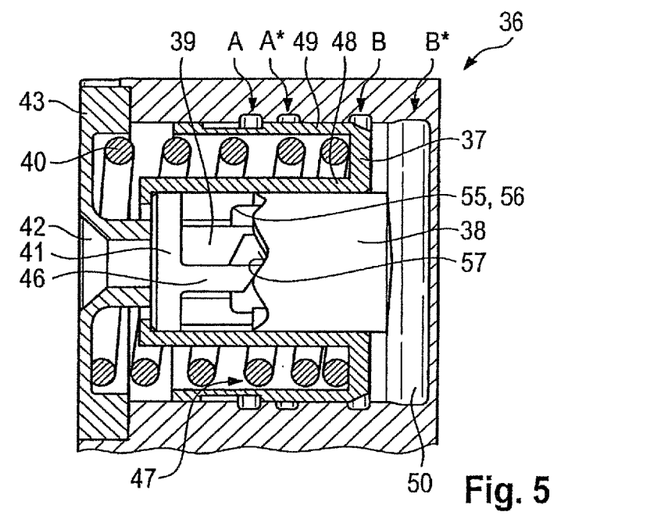
FIG. 5 shows a second cross section of a switching valve in the second switch position thereof.

In the second switch position of the switching valve 36, illustrated in FIGS. 4, 5 and 7, on the other hand, the ports A and A* are separated and the ports B and B* are short-circuited or connected, so that the pressure conditions in at the hydraulic chambers 22 and 23 are inverted.

In the second switch position of the switching valve 36, the hydraulic chamber 22 can thus be emptied in the direction of the arrow 54 via the fluid line 30 which is coupled with the fluid line 52 when the ports B and B* of the switching valve 52 are short-circuited, whereas no hydraulic oil can flow off via the fluid line 31 of the hydraulic chamber 23. Engine oil pressure prevails in the fluid line 52.

The switching valve 36 comprises a control piston 37 which defines the switch position of the switching valve 36, wherein the control piston 37, when in the first switch position of the switching valve 36 illustrated in FIGS. 2, 3 and 6, connects or short-circuits the ports A and A* and separates the ports B and B* from each other, whereas the control piston 37, when in the second switch position of the switching valve 36, separates the ports A and A* from each other and connects the ports B and B* with each other or short-circuits them.

The control piston 37 of the switching valve 36 is actuated or shifted or switched by a switching mechanism of the switching valve 36, similar to a ball pen mechanism, wherein this switching mechanism comprises at least a shiftable actuation element 38 and a stationary detent element 39.

In the preferred embodiment of the switching valve 36 illustrated, the switching mechanism for actuating or shifting or switching the control piston 37 comprises, in addition to the actuation element 38 and the detent element 39, a spring element 40, serving as a restoring element, and a turning element 41.

The detent element 39 is mounted to the lid 43 of the switching valve 36 by a screw connection 42, with the detent element 39 being stationary. The detent element 39 has grooves 44, 45 of different depths that cooperate with projection 46 of the turning element 41. In the first switch position illustrated in FIGS. 2, 4 and 6, the projections 46 of the turning element 41 extend into the longer or deeper grooves 45 of the detent element 39, whereas in the second switch position of the switching valve 36 illustrated in FIGS. 4, 5 and 7, The projections 46 of the turning element 41 extend into the shorter or shallower grooves 44 of the detent element 39.

The spring force exerted by the spring element 40 presses the turning element 41 with its projections 46 into the grooves 44 or the grooves 45 of the detent element 39 depending on the switch position of the switching valve 36 or depending on the relative to the rotational position of the turning element 41 relative to the stationary detent element 39, wherein the spring force of the spring element 40 is transmitted onto the turning element 41 via the control piston 37. FIGS. 2 to 5 show that the spring element 40 is supported at the lid 43 of the switching valve 36 and, on the other hand, at the control piston 37 of the switching valve 36, wherein the turning element 41 is supported at a section of the control piston 37.

In order to transition the switching valve 36 between the two switch positions, an actuation pulse can be applied to the actuation element 38 of the switching valve 36 and the control piston 37. Due to such an actuation pulse, the actuation element 38 is moved to the left relative to the stationary detent element 39 with respect to the positions illustrated in FIGS. 2 to 5, wherein the actuation element 38 takes the turning element 41 along and moves the projections 46 of the turning element 41 out of the respective grooves 44 and 45 of the detent element 39.

Here, the projections 46 of the turning element 41 are disengaged from the grooves of the detent element 39 so that the turning element 41 can turn relative to the detent element 39, specifically under control by oblique edges 55, 56 on the detent element 39, as well as on the projections 36 of the turning element 41, wherein these oblique edges 55, 56 slide on each other because of the spring force provided by the spring element 43.

Due to the turning of the turning element 41 relative to the stationary detent element 39, the projections 46 of the turning element 41 arrive in the region of a relatively short groove 44, if they were in engagement with a relatively long groove 45 of the detent element 39 before, whereas, if the projections 46 were in engagement with a relatively short groove 44 of the detent element 39 before, they then arrive in the region of a relatively long groove 45 of the detent element 39 due to the turning of the turning element 41.

Thereby, the control piston 37, and thus the switching valve 36, can be transitioned between the above-mentioned switch positions.

In the respective switch positions, the projections 46 of the valve element 41 not only engage in one of the respective grooves 44, 45 of the stationary detent element 39, but the projections 46 also abut against the actuation element 38, specifically against a profiled contour 57 thereof.

The above-mentioned interaction of the control piston 37 of the switching valve 36 with the elements of the switching mechanism of the switching valve 36, in particular the actuation element 38, the detent element 39, the spring element 40 and the turning element 41, basically corresponds to the functional principle of a ball pen mechanism.

In order to provide a compact structure of the switching valve 36, at least the control piston 37 of the switching valve 36, as well as the actuation element 38 and the detent element 39 of the switching mechanism are nested such that the same are implemented in a concentrically overlapping manner, at least in sections, when seen in the shifting direction of the control piston 37.

FIGS. 2 to 5 show that the control piston 37 of the switching valve 36 concentrically encloses or surrounds the actuation element 38 and the detent element 39, at least in sections, on the radially outer side, with the actuation element 38 enclosing or surrounding the detent element 39, at least in sections, on the radially outer side.

The stationary detent element 39 thus protrudes into the actuation element 38, at least in sections, and the actuation element 38 extends into the control piston 37, at least in sections.

In the preferred embodiment, also the spring element 40 is nested with the above assemblies of the switching valve 36, wherein the spring element 40 concentrically encloses or surrounds the actuation element 38 and the detent element 39, at least in sections, on the radially outer side. FIGS. 2 to 5 show that the spring element 40 extends into a circumferential groove 47 of the control piston 37 and that it is supported at the control piston 37 in the area of the groove bottom of this groove 47, wherein the circumferential groove 47 of the control piston 37 is defined by a radially inner wall 48 and a radially outer wall 49. Here, the spring element 40 concentrically encloses or surrounds the radially inner wall 48 of the groove 47, at least in sections, on the radially outer side, wherein the radially outer wall 49 of the groove 47 concentrically encloses or surrounds the spring element 40, at least in sections, on the radially outer side.

Further, the turning element 41 of the switching mechanism is nested with the above assemblies of the switching mechanism such that the control piston 37 encloses or surrounds the turning element 41, at least in sections, on the radially outer side, the turning element being positioned ahead of or behind the actuation element 38, when seen in the shifting direction of the control piston 17.

Referring to FIGS. 2 to 4, the turning element 41 concentrically encloses or surrounds the stationary detent element 39, at least in sections, on the radially outer side.

In the preferred embodiment of a switching valve 36 shown, the control piston 37 of the switching valve 36, as well as all elements of the switching mechanism similar to a ball pen mechanism, i.e. the actuation element 38, the detent element 39, the turning element 41 and the spring element 40, are nested one in the other, so that an extremely compact structure of the switching valve 36 can be provided.

The actuation element 38 and the turning element 41, situated ahead of or behind the same, when seen in the shifting direction of the actuation element 38, protrude into the control piston 37, i.e. the turning element 41 protrudes into the same completely and the actuation element 38 does so at least in part.

The control piston 37 thus concentrically surrounds the entire turning element 41 on the radially outer side, while the actuation element 38 is concentrically surrounded by the control piston 37, at least in sections, on the radially outer side. The stationary detent element 39 extends in the turning element 41 and the actuation element 38, so that the detent element is concentrically surrounded, in sections, by the turning element 41 and, in sections, by the actuation element 38 on the radially outer side.

The turning element 41 can be shifted not only by the actuation element 38, but also by the control piston 37. The turning element 41 is supported at its rear side on the control piston 37. When the control piston 37 moves in dependence on the oil pressure, the turning element 41 moves along.

The spring element 40, which protrudes into the circumferential groove 47 of the control piston 37, is also nested with these components, specifically such that the spring element 40 concentrically surrounds the actuation element 38, the turning element 41 and the detent element 39, at least in sections, on the radially outer side.

As already detailed before, it is possible to influence the pressure level in the hydraulic chambers 22 and 23, which cooperate with the eccentric rods 15 and 16 of the eccentric adjustment mechanism 13, via the switch position of the switching valve 36. In the switch position shown in FIGS. 2, 3 and 6, an elevated hydraulic pressure may build in the hydraulic chamber 22, and in the switch position shown in FIGS. 4, 5 and 7, an elevated hydraulic pressure may build in the hydraulic chamber 23, wherein it is possible to empty or vent the hydraulic chamber 23 in the switch position shown in FIGS. 2, 3 and 6 or the hydraulic chamber 22 in the switch position shown in FIGS. 4, 5 and 7.

For this purpose the ports A and A* of the switching valve 36 are short-circuited in the switch position shown in FIGS. 2, 3 and 6 through the corresponding position of the control piston 37. In the switching position shown in FIGS. 4, 5 and 7, the ports B and B* of the switching valve 36 are short-circuited by the control piston 37.

Another special feature of the switching valve 36 is that the port B* of the switching valve 36, which is short-circuited with the port B in the switch position shown in FIGS. 4, 5 and 7 in order to empty or vent the hydraulic chamber 22, is provided directly by a pressure chamber 50 in which an actuation pressure for the actuation of the actuation element 39 can be built in the form of an actuation pulse. Thereby, the structure of the switching valve 36 can be shortened further.

A defined oil pressure always prevails in the pressure chamber 50, so that each of the two hydraulic chambers 22, 23 is emptied against the oil pressure prevailing in the pressure chamber.

Preferably, the switching valve 36 is installed on the respective connecting rod 10 in the longitudinal direction with respect to the crank shaft. In FIG. 3, a longitudinal axis of the crankshaft accordingly extends in the drawing plane. It can thereby be ensured that acceleration forces do not act in the spring direction of the spring element 40.

The switching valve 36 has a very compact structure and may be realized with a total length of about 20 mm at most, so that it can be installed between side walls of the respective connecting rod 10.

The invention claimed is:

1. A switching valve integral to a connecting rod for an internal combustion engine having an adjustable compression ratio, the switching valve is configured to control a hydraulic oil flow for an eccentric adjustment mechanism, the switching valve comprising: a control piston configured to be shifted by a switching mechanism, wherein the control piston controls the hydraulic oil flow dependent on a switch position thereof, and wherein the switching mechanism includes an actuation element and a detent element, wherein the control piston, the actuation element and the detent element are nested in each other so that the control piston, the actuation element and the detent element are disposed in a circumferentially and concentrically overlapping manner, at least in sections, when viewed in a shifting direction of the control piston.

2. The switching valve of claim 1, wherein the control piston concentrically surrounds the actuation element and the detent element, at least in sections, on a radially outer side of the actuation element.

3. The switching valve of claim 2, wherein the actuation element concentrically surrounds the detent element, at least in sections, on the radially outer side of the detent element.

4. The switching valve of claim 1, wherein the switching mechanism further includes a spring element serving as a restoring element, which concentrically surrounds the actuation element and the detent element, at least in sections, on a radially outer side of the actuation element.

5. The switching valve of claim 4, wherein the spring element extends into a circumferential groove of the control piston and is supported at the control piston.

6. The switching valve of claim 5, wherein the spring element concentrically surrounds a radially inner delimiting wall of the groove, at least in sections, on the radially outer side and that a radially outer delimiting wall of the groove concentrically surrounds the spring element, at least in sections, on the radially outer side.

7. The switching valve of claim 1, wherein the switching mechanism further includes a turning element positioned ahead of or behind the actuation element, when seen in the shifting direction of the control piston.

8. The switching valve of claim 7, wherein the control piston concentrically surrounds the turning element on a radially outer side of the turning element.

9. The switching valve of claim 7, wherein the turning element concentrically surrounds the detent element, at least in sections, on the radially outer side of the detent element.

10. The switching valve of claim 7, wherein the actuation element presses against the turning element or that the turning element presses against the actuation element.

11. The switching valve of claim 7, wherein the turning element is configured to be shifted translationally by the actuation element, wherein when at least one protrusion of the turning element has been moved out of a groove of the detent element the turning element can be turned with respect to the detent element.

12. The switching valve of claim 7, wherein the control piston connects first ports and separates second ports, when in a first switch position, and that the control piston separates the first ports and connects the second ports, when in a second switch position, such that, in the first switch position, a first fluid line coupled with one of the first ports and leading to a first hydraulic chamber of the eccentric adjustment mechanism is coupled with a second fluid line for emptying the first hydraulic chamber, which fluid line is coupled with the other of the first ports, and that, in the second switch position, a third fluid line coupled with one of the second ports and leading to a second hydraulic chamber of the eccentric adjustment mechanism is coupled with a fluid line for emptying the second hydraulic chamber, which fluid line is coupled with the other of the second ports,
wherein one of the other of the first ports and the other of the second ports via which the respective hydraulic chamber can be emptied is provided by a pressure chamber in which, for the actuation of the actuation element, a pressure pulse can be built so that the respective hydraulic chamber is emptied into the pressure chamber that serves to actuate the actuation element.

13. The switching valve of claim 12, wherein both the other of the first ports and the other of the second ports via which the hydraulic chambers can be emptied, are connected with the pressure chamber that serves to actuate the actuation element, so that each of the two hydraulic chambers is respectively emptied against the oil pressure prevailing in the pressure chamber.

14. A method for a switching valve integral to a connecting rod of an internal combustion engine, preferably a switching valve, the internal combustion engine has an adjustable compression ratio, the switching valve configured to control a hydraulic oil flow for an eccentric adjustment mechanism, wherein the switching valve includes a control piston configured to be shifted by a switching mechanism wherein the hydraulic oil flow is controlled in dependence on a switch position of the control piston, and the switching mechanism includes an actuation element and a detent element, the method comprising at least the following steps: determining the switch position of the switching valve via the control piston the control piston connects first ports and separates second ports, when in a first switch position, and the control piston separates the first ports and connects the second ports, when in a second switch position, such that, in the first switch position, a fluid line coupled with one of the first ports and leading to a first hydraulic chamber of the eccentric adjustment mechanism is coupled with a fluid line for emptying the first hydraulic chamber, which fluid line is coupled with the other of the first ports, and that, in the second switch position, a fluid line coupled with one of the second ports and leading to a second hydraulic chamber of the eccentric adjustment mechanism is coupled with a fluid line for emptying the second hydraulic chamber, which fluid line is coupled with the other of the second ports, wherein both of the other of the first ports and the other of the second ports via which the respective hydraulic chamber is emptied is provided by a pressure chamber; switching the switching valve between the first switch position and the second switch position by actuating the actuation element by building up an actuation pulse in the pressure chamber; and emptying the respective hydraulic chamber into the pressure chamber that serves to actuate the actuation element.

15. The method of claim 14, wherein both the other of the first ports and the other of the second ports, via which the hydraulic chambers are emptied, are connected with the pressure chamber that serves to actuate the actuation element so that each of the two hydraulic chambers is respectively emptied against the oil pressure prevailing in the pressure chamber.

16. The method of claim 14, wherein, as the switching valve is transitioned from the first switch position into the second switch position by actuation of the actuation element, the actuation element is pressed against a turning element or the turning element is pressed against the actuation element,
wherein the switching mechanism includes the turning element, wherein, as seen in a shifting direction of the control piston, the turning element is positioned ahead of or behind the actuation element, so that the turning element is shifted translationally via the actuation element,
wherein the turning element is turned relative to the detent element when at least one projection of the turning element is moved out of a groove of the detent element.

17. The method of claim 14, wherein the actuation element is shifted by the control piston upon a movement of the control piston in dependence on an oil pressure.

18. An internal combustion engine having an adjustable compression ratio, the internal combustion engine comprising: at least one cylinder; and a crankshaft which is engaged by at least one connecting rod, wherein the at least one connecting rod has a crank pin bearing eye that connects the at least one connecting rod with the crankshaft, a piston pin bearing eye that connects the at least one connecting rod with a piston of a cylinder and an eccentric adjustment mechanism that adjusts an effective connecting rod length of the respective at least one connecting rods, wherein the eccentric adjustment mechanism of the respective at least one connecting rods, includes eccentric rods which are subjected to a hydraulic pressure prevailing in hydraulic chambers cooperating with the eccentric rods, and wherein the hydraulic pressure prevailing in the hydraulic chambers of the respective connecting rod is configured to be adjusted via a switching valve of the respective connecting rod, wherein a switching mechanism of the switching valve includes an actuation element and a detent element, a control piston, the actuation element and the detent element are nested in each other so that the control piston, the actuation element and the detent element are disposed in a circumferentially and concentrically overlapping manner, at least in sections, when viewed in a shifting direction of the control piston.

\* \* \* \* \*